(12) United States Patent
Teich

(10) Patent No.: US 6,916,057 B2
(45) Date of Patent: Jul. 12, 2005

(54) FOLDING VEHICLE SEAT

(75) Inventor: Michael Teich, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/781,391

(22) Filed: Feb. 18, 2004

(65) Prior Publication Data

US 2004/0164598 A1 Aug. 26, 2004

(30) Foreign Application Priority Data

Feb. 20, 2003 (DE) .......................................... 103 07 149

(51) Int. Cl.$^7$ ................................................ B60N 2/02
(52) U.S. Cl. ................................ 296/65.08; 296/65.14; 297/331; 297/337
(58) Field of Search .......................... 296/65.05, 65.08, 296/65.13, 65.14, 65.15; 297/313, 331, 330, 332, 333, 334, 337; 244/122 R

(56) References Cited

U.S. PATENT DOCUMENTS

| 4,779,926 | A | * | 10/1988 | Maruyama | ................... 297/324 |
|---|---|---|---|---|---|
| 5,524,722 | A | * | 6/1996 | Bowman et al. | ......... 180/89.17 |
| 5,797,649 | A |  | 8/1998 | Snell, Jr. et al. | ............... 297/14 |
| 5,800,015 | A | * | 9/1998 | Tsuchiya et al. | ............ 297/331 |
| 5,918,937 | A |  | 7/1999 | Moffa et al. | ................. 297/324 |

FOREIGN PATENT DOCUMENTS

| DE | 1 917 125 | 7/1970 |
|---|---|---|
| DE | C-21 59 689 | 6/1973 |
| DE | A-22 27 659 | 12/1973 |
| DE | 25 03 695 B2 | 9/1975 |
| GB | 2 372 438 A | 8/2002 |

* cited by examiner

Primary Examiner—Joseph D. Pape

(57) ABSTRACT

A folding vehicle passenger seat for agricultural or industrial utility vehicles, includes a seat member which can be pivoted from a seated position to a position folded upward. A sliding bearing mechanism is coupled to the rear portion of the seat member so that the seat member can be guided in a sliding motion and so that the seat member can pivot about an axis. When the seat member is folded upward the sliding bearing mechanism slides downward from an upper position along the guide and simultaneously rotates relative to the guide.

24 Claims, 5 Drawing Sheets

FOLDING VEHICLE SEAT

BACKGROUND

The invention relates to a folding passenger seat for agricultural or industrial utility vehicles.

A folding passenger seat with a foot support for agricultural vehicles is described in published German patent application no. DE-A-22 27 659. The seat surface has four spars which form a rectangular seat frame which is covered with fabric. A rear spar of the seat frame is supported in pivot bearings fastened to the vehicle fender, so that the seat frame can be pivoted upward about a horizontal axis to a position against a shell of the fender. This very simple passenger seat is not very comfortable, lacks upholstery and back rest, and appears to be intended primarily for children.

German patent no. 21 59 689 C3 describes a passenger seat for vehicles such as tractors, towing vehicles, construction vehicles, etc., which can be pivoted into an out-of-service position, which includes a multi-part linkage connected by hinges, and which is to be retained by chain-like connections or loops in in-service and out-of-service positions. The orientation of the passenger seat may be changed by changing the positions of hanging of the chain connections. However, otherwise the configuration does not meet today's safety requirements since the connecting chains permit neither a locking nor an exact positioning of the seat position.

SUMMARY

Accordingly, an object of this invention is to provide a vehicle seat which is comfortable and which can be folded.

A further object of the invention is to provide such a folding passenger seat which is light weight and which can be operated easily.

A further object of the invention is to provide such a seat which occupies little space in its folded, out-of-service position, so that an unimpeded access to the operator's seat of the vehicle is assured.

A further object of the invention is to provide such a seat which is supported in a stable condition in its seat position as well as in its out-of-service position and which is safe.

These and other objects are achieved by the present invention wherein a rear part of a vehicle seat includes a sliding bearing mechanism so that the seat member is both slidable and pivotal with respect to the vehicle body when the seat is folded upward from its seat position into its out-of-service position. The sliding bearing mechanism slides from an upper position along a guide into a lower position and simultaneously rotates relative to the guide. Preferably, the seat includes a back rest and a seating member which has a seating surface. The seat member contacts the back rest when it is folded upward. When the seat member is in its folded position, the forward edge of the seat member does not project beyond the upper edge of the back rest because the seat member is lowered as it is rotated into its folded position. This permits the use of a comfortable seat member with a sufficiently long seat surface.

DETAILED DESCRIPTION

Figure 1:
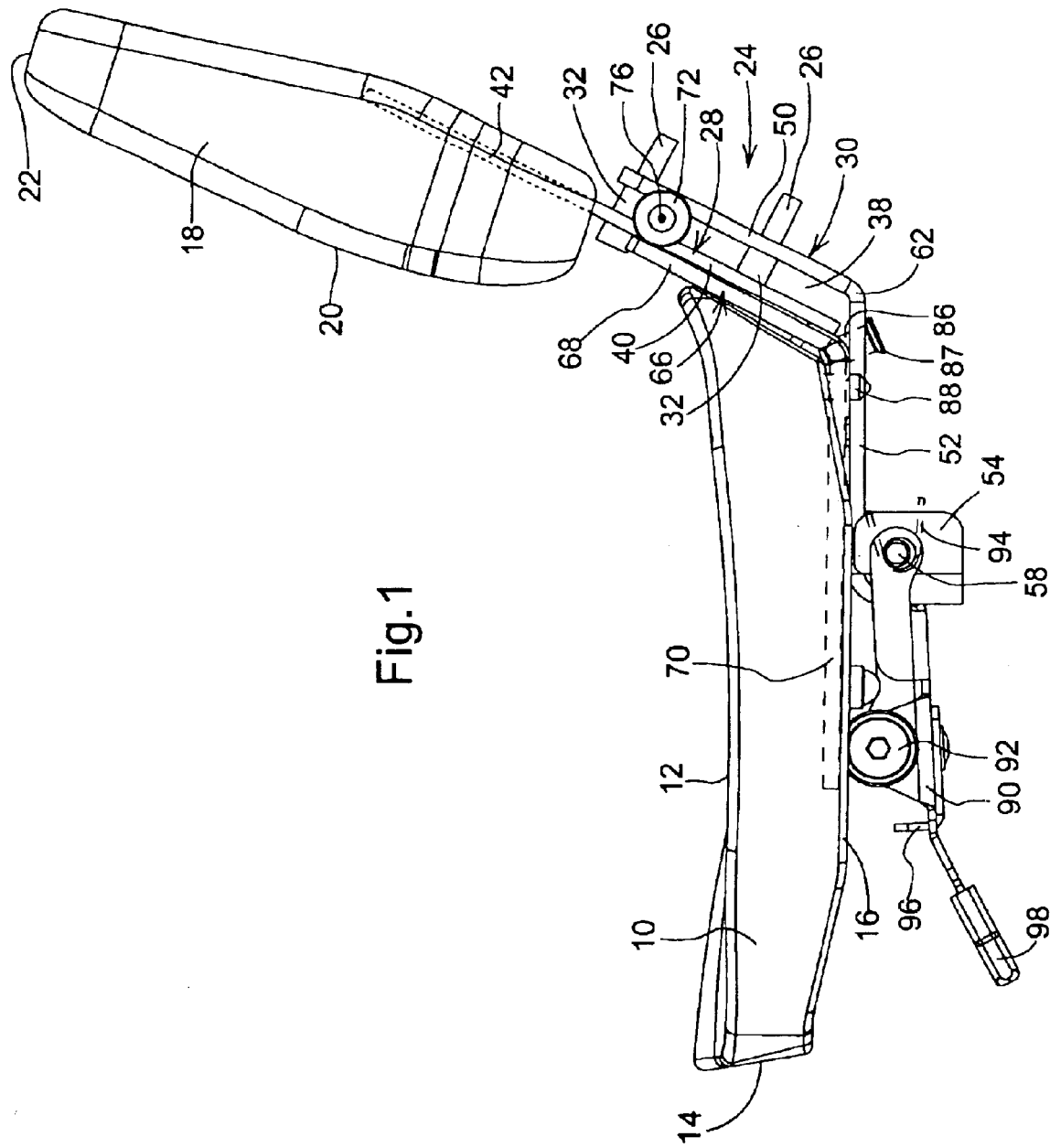
FIG. 1 is a side view of a folding passenger seat according to the invention with the seat pivoted downward into the seating position.
Figure 2:
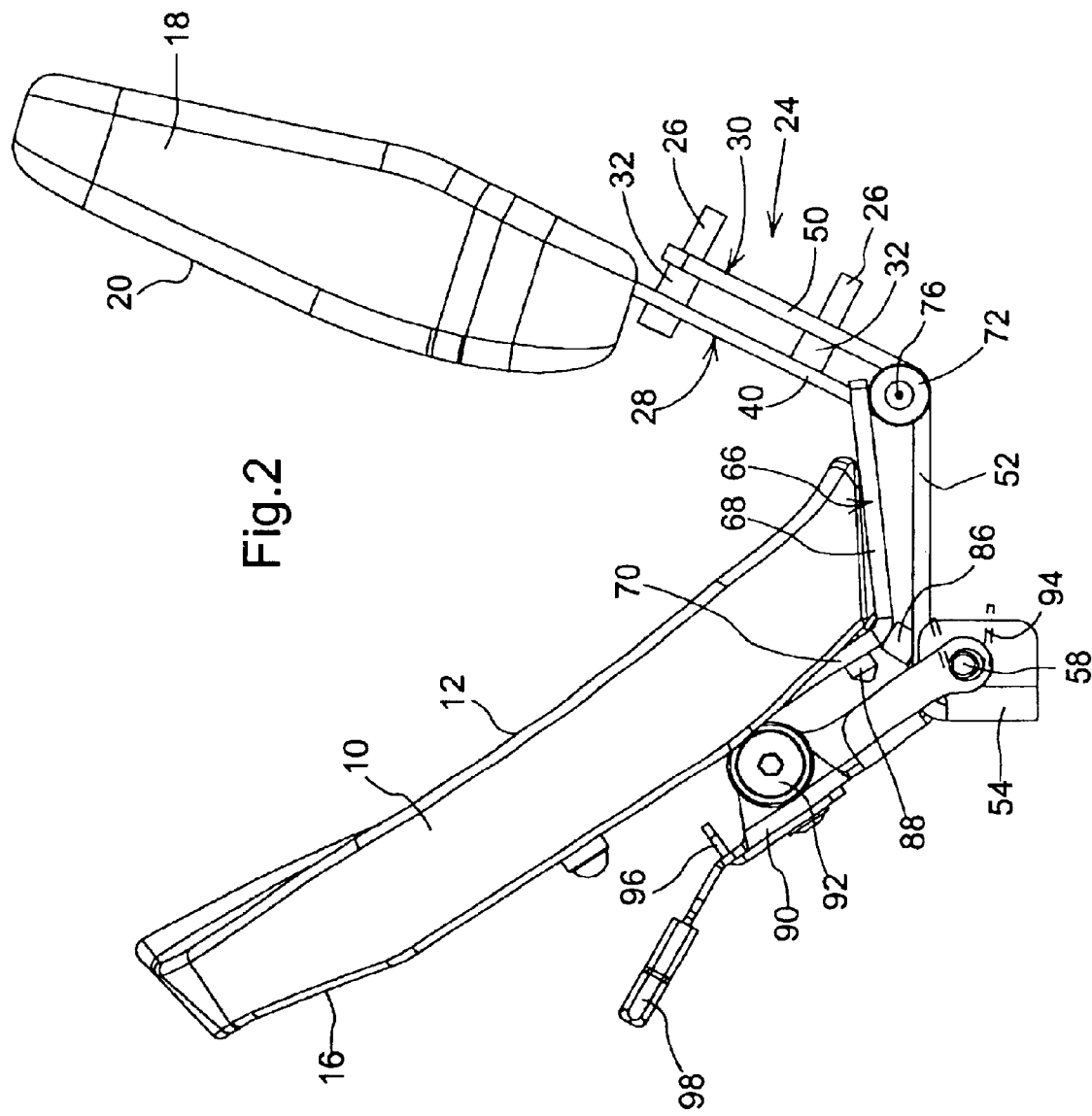
FIG. 2 is a side view of a vehicle seat of FIG. 1 in half-raised position.
Figure 3:
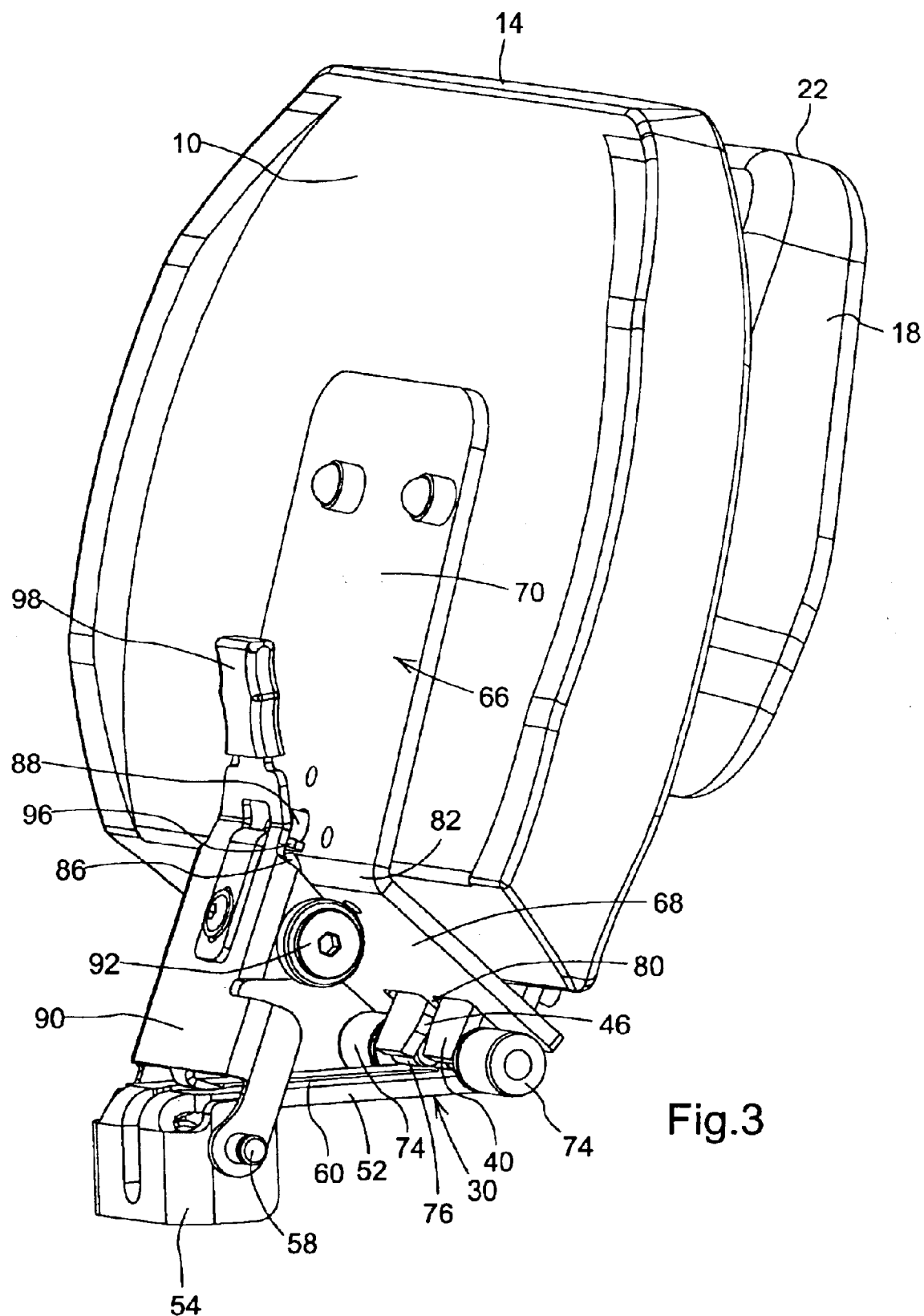
FIG. 3 is a perspective view of a vehicle seat of FIG. 1 in a fully raised position.

FIGS. 1–3 show a folding vehicle seat which may be used in an agricultural utility vehicle such as a tractor, and which may be positioned alongside the operator's seat and used as a passenger seat. The vehicle seat includes a seat member 10, with a seat surface 12, a front edge 14 and an underside 16 as well as a back rest 18 with a back surface 20 and an upper edge 22.

The back rest 18 is rigidly fastened to a guide 24. Guide 24 is rigidly fastened by means of screws 26 to a console (not shown) in a vehicle cab (not shown). The console is not vertical, but extends at an angle to the vertical of approximately 65°, so that in the assembled condition, the guide 24 also extends in this direction. In FIG. 1, the seat member 10 is shown in its lowered or seated position. In FIG. 2, the seat member is shown in an intermediate position, and in FIG. 3, the seat member is in a raised, pivoted upward, and out-of-service position.

Figure 4:
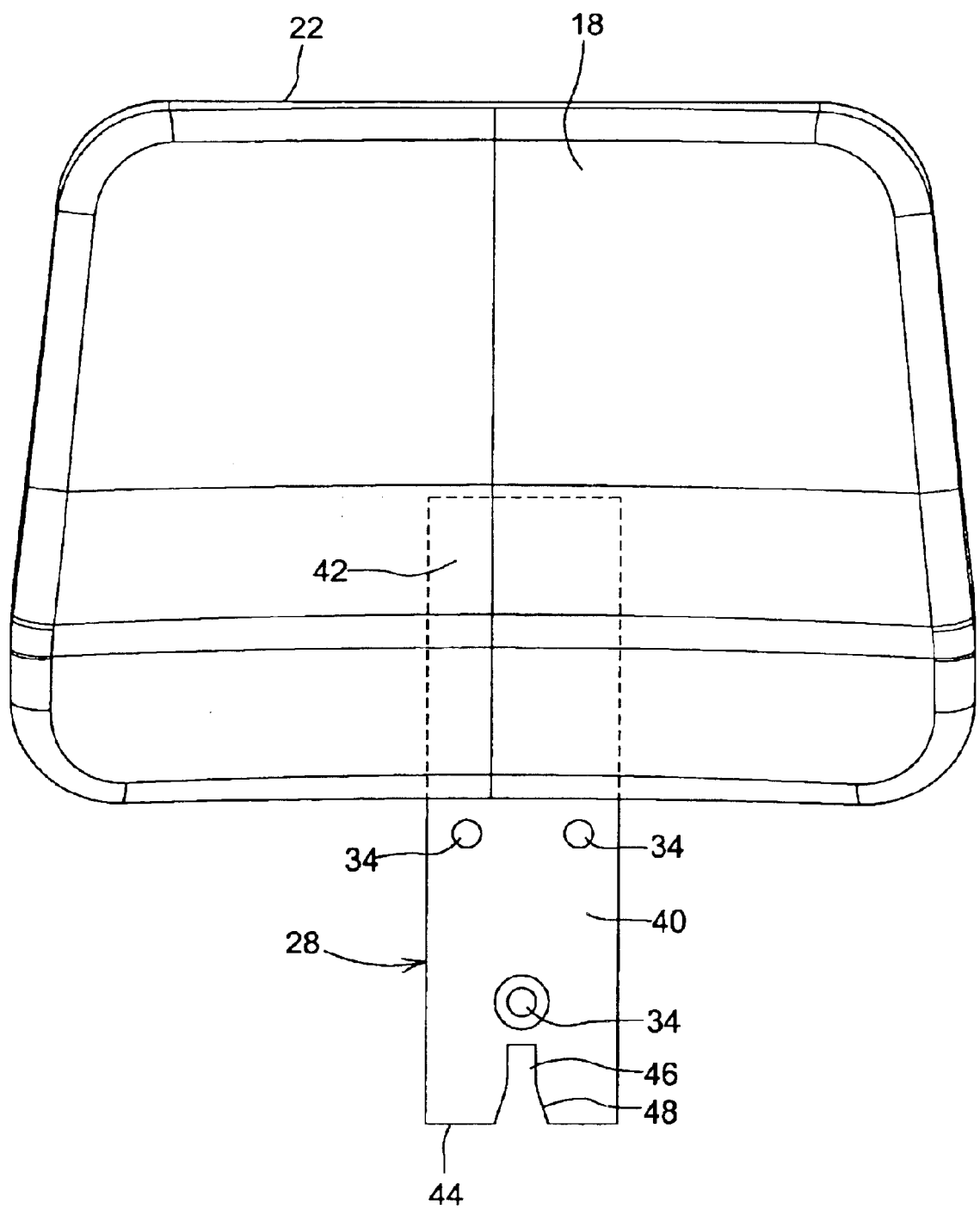
FIG. 4 is a view of a back rest with a first plate attached to it.
Figure 5:
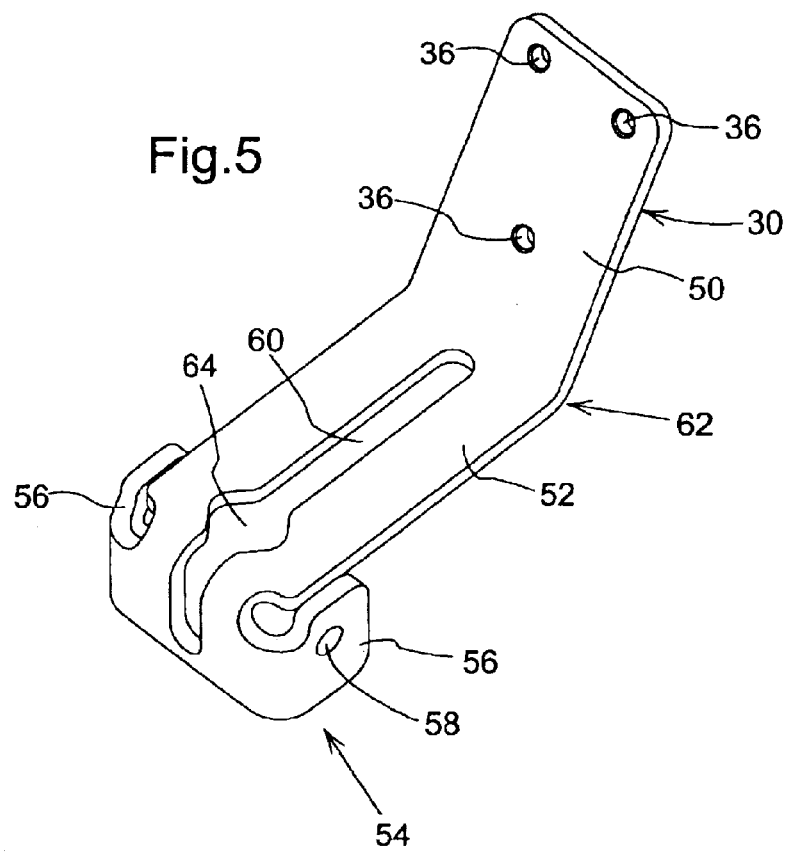
FIG. 5 is a perspective view of a second plate.

The guide 24 is partially formed by a first plate 28, a second plate 30 and connectors such as screws 26 and spacer sleeves 32 which are arranged between the two plates 28, 30 and through which the screws 26 extend. As best seen in FIGS. 4 and 5, the screws 26 extend through bores 34, 36 in the first plate 28 and the second plate 30. The spacer sleeves 34 hold the two plates 28, 30 spaced apart and parallel to each other, forming a space 38 therebetween which has a constant width.

The first plate 28 has a first leg 40 which forms part of the guide 24 and a second leg 42 which extends into and is attached to the back rest 18. The first plate 28 is preferably made of a planar sheet metal. A lower end 44 of plate 28 has a central slot 46 which has a section 48 which opens in the shape of a cone to the edge of the plate 28.

The second plate 30 includes a first planar leg 50 which forms part of the guide 24 and a second planar leg 52 which extends from leg 50. The second plate 30 is angled so that its two legs 50, 52 extend at an angle of approximately 115° to each other. An end of the second leg 52 forms a bearing support 54 which includes two brackets 56 located opposite each other. Bores 58 extend through the brackets 56 and define a pivot bearing axis. A longitudinal slot 60 in the second plate 30 extends from the bend 62 between the legs 50 and 52 through leg 52 and into the bearing support 54. The slot 60 has a uniform width except for an enlarged portion 64. The enlarged portion 64 is located in the second leg 52 remote from the bend 62 and close to the bearing support 54. The second plate 30 can be manufactured from sheet metal and cut to corresponding size and bent.

Figure 6:
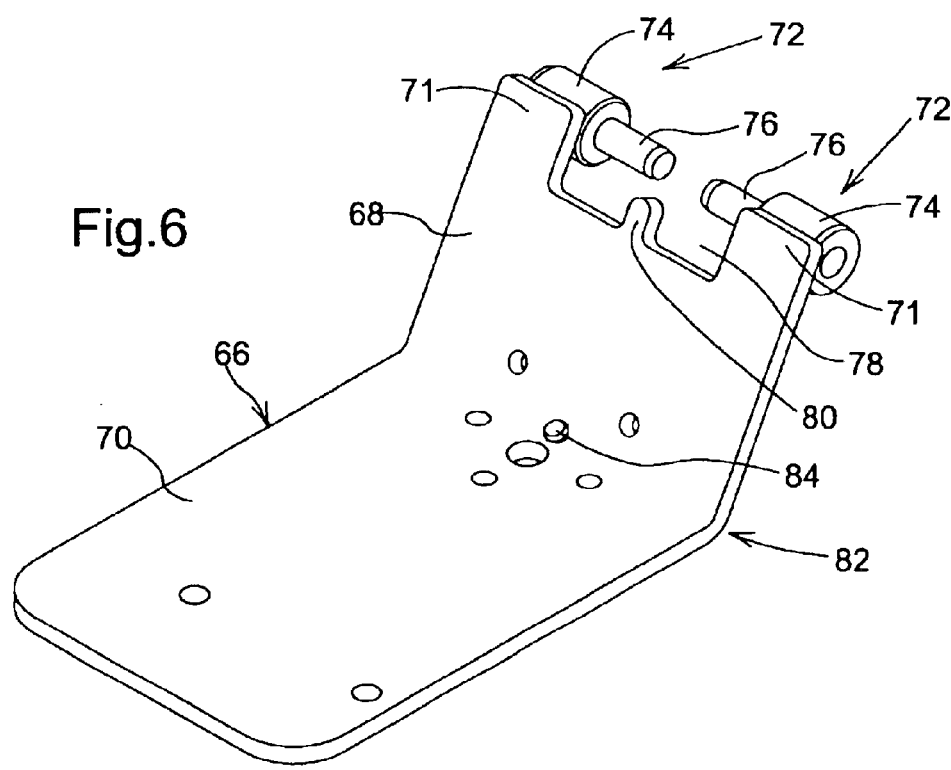
FIG. 6 is a perspective view of a third plate.

As best seen in FIG. 6, third plate 66 includes a first planar leg 68 and a second planar leg 70. The third plate 66 is also angled so that legs 68, 70 extend at angles of approximately 115° to each other. A pair of cylindrical bearing elements 72 are supported at free end 71 of the leg 68. Each bearing element 72 includes a larger diameter section 74 and a smaller diameter pin 76. The diameters of the pins 76 conform to the width of the space 38 between the first and second plates 28, 30. The pins 76 can slide and rotate in the space 38. A side of section 74 of each bearing element 72 is fastened to a side of the free end 71 of leg 68, such as by welding, so that the pins 76 face each other and form an axis. A slot 78 is formed in the center of end 71 and a tab 80 projects into the center of slot 78.

Plate 66 forms a bend 82 between the legs 68, 70. A bore 84 extends through the bend 82 and receives a locking element or pin 86 (best seen in FIG. 3). As best seen in FIG. 1, pin 86 includes a shank and a head 87. The shank of pin 86 is dimensioned so that it can slide and be shifted within the longitudinal slot 60 of the second plate 30. However, the diameter of the head region 87 is larger than the width of the longitudinal slot 60. It can be inserted into and retracted from the slot 60 only in through the enlarged slot portion 64.

The seat member 10 is preferably bolted to the second leg 70 of plate 66. A pin 88 projects on the underside 16 of the seat member 10 or from the third plate near the pin 86.

The third plate 66 can be latched together with the seat member 10 into the guide 24 so that the pins 76 are received by the space 38 between plates 28, 30, and the head 87 of pin 86 is inserted through the enlarged slot portion 64 of the slot 60 of the second plate 30. The bearing elements 72 can be slid within the guide between an upper end position and a lower end position. If the seat member 10 is located in the seated position shown in FIG. 1, the bearing elements 72 assume an upper position. If the seat member 10 is pivoted upward out of this position, so that its front edge 14 is raised, then the head 87 of pin 86 is guided in the longitudinal slot 60 and prevents the third plate 66 from being pivoted away from the second plate 30, and allows only a relative sliding movement along the slot 60. Simultaneously, the bearing elements 72 move downward in the guide 24 until they reach their lower end position, as is shown in FIG. 2. In the lower end position the pin 86 reaches the enlarged slot portion 64 so that the head 87 of pin 86 can exit from the slot 60. If the seat member 10 is raised further, it pivots about the axis of the bearing elements 72 along with the third plate 66 until the seat surface 12 comes into contact with the back surface 20. During this movement the seat member 10 has been lowered to such a point that its front edge 14 does not project upward above the upper edge 22 of the back rest 18, as best seen in FIG. 3.

When the seat member 10 is fully pivoted and folded upward, the tab 80 of the third plate 66 moves into the slot 46 of the first plate 28. The insertion is simplified by the cone shaped configuration of the slot 46. This fixes the rear portion of the seat member 10, so that a stable location of the seat member 10 is assured in its folded upward position, wherein the rear seat portion will become the lowest part of the seat.

In order to support the upward pivoting of the seat member 10, an actuating lever 90 is pivotally coupled at the pivot bearing axis 58. Two pulleys 92 are mounted at the sides of the central portion of lever 90. A spring 94 urges the lever 90 towards the underside 16 of the seat member 10, so that when the seat member 10 is pivoted upward the pulleys 94 roll along the underside 16 and transmit the spring force to the seat member 10. A bracket 96 is mounted on the lever 90 and has an end which extends towards the seat member 10. A handgrip 98 projects from an end of lever 90. As best seen in FIG. 3, when the seat member 10 is pivoted completely upward, the end of bracket 96 engages the third plate 66. If a force is applied to the seat member 10 to fold the seat member 10 downward, then pin 88 engages bracket 96 and prevents a folding movement. The seat member 10 can be folded down only if the operator grasps handgrip 98 and pivots the actuating lever 90 away from the underside 16 of the seat member 10, so that the bracket 96 disengages from pin 88.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A folding passenger seat for a work vehicle with a seat member which is pivotal from a lowered seated position to upper storage position, characterized by:

a guide mounted on a body of the vehicle, the guide extending upwardly and rearwaedly from a rear portion of the seat member;

a bearing mechanism attached to a rear portion of the seat member, the bearing mechanism being slidable in the guide, the seat member being pivotal with respect to the guide about an axis of the bearing mechanism so that when the seat member is folded upwardly, the bearing mechanism slides downwardly along the guide and simultaneously rotates relative to the guide.

2. The seat according of claim 1, wherein:

the seat includes a back rest, the seat member engaging the back rest when the seat member is pivoted upward.

3. The seat of claim 2, characterized by:

the guide comprises a first plate and a second plate which are spaced apart and parallel to each other, the plates defining a space therebetween which receives the bearing mechanism when the seat member is lowered.

4. The seat of claim 1, characterized by:

the guide comprises a first plate and a second plate, the first plate carrying a back rest, the first and second plates being connected to each other with spacers, and the second plate being connected to the vehicle body.

5. The seat of claim 4, characterized by:

the first and second plates are parallel to each other and extend in a direction substantially parallel to the back rest.

6. The seat of claim 3, wherein:

the seat member is mounted on a third plate which is substantially parallel to the first and second plates, a portion of the third plate being above portions of the first and the second plate.

7. The seat of claim 6, wherein:

the third plate includes first and second parts, the second part extending at an angle with respect to the first part.

8. The seat of claim 7, wherein:

the second part of the third plate extends generally in the same direction as the seat member.

9. The seat of claim 6, wherein:

the sliding bearing mechanism engages an upper end of the third plate when the seat member is in its seated position.

10. The seat of claim 6, wherein:

the bearing mechanism comprises a pair of horizontally extending pins mounted on opposite sides of the third plate and extending towards each other, the pins having free ends which engage the guide.

11. The seat of claim 7, wherein:

the second plate has first and second legs, the second leg extending at an angle with respect to the first leg, the second part of the third plate laying above and generally parallel to the second leg of the second plate when the seat member is in the seated position.

12. The seat of claim 11, further comprising:

a locking element projecting from the third plate and towards the second plate, the locking element being received by a central longitudinal slot formed in the second leg of the second plate.

13. The seat of claim 12, wherein:

the locking element comprises a pin which projects from the second plate, an outer end of the pin having dimensions which are larger than a width of the longitudinal slot.

14. The seat of claim 13, wherein:

the longitudinal slot has an enlarged portion through which the outer end of the pin can be inserted and withdrawn.

15. The seat of claim 14, wherein:

the enlarged portion is spaced apart from a bend formed by the first and second legs of the second plate.

16. The seat of claim 6, wherein:

a central slot is formed in the second plate; and the third plate includes a locking element which is received by the slot.

17. The seat of claim 1, further comprising:

an actuating lever which is pivotal about a pivot axis; and a spring biased to urge the actuating lever against a underside of the seat member.

18. The seat of claim 17, characterized by:

a pulley rotatably mounted on the actuating lever and spaced apart from the pivot axis, the pulley rolling along the underside of the seat member when the seat member is pivoted.

19. The seat of claim 17, further comprising:

a handgrip projecting from an end of the actuating lever.

20. The seat of claim 17, wherein:

a pin projects from the underside of the seat member; and the actuating lever includes a bracket which projects from the actuating lever and towards the seat member, the bracket engaging the pin when the seat member is in a fully erect position.

21. The seat of claim 6, wherein:

the first plate carries a back rest and has a free end which faces away from the back rest, the free end having a central slot formed therein; and the third plate includes first and second legs, the second leg being attached to the seat member and the second leg projecting away from the first leg, the second leg having a tab which projects therefrom and which is received by the central slot of the first plate, when the seat member is in its storage position.

22. A folding passenger seat for a work vehicle with a seat member which is pivotal from a lowered seated position to upper storage position, characterized by:

the seat includes a back rest, the seat member engaging the back rest when the seat member is pivoted upward;

a guide mounted on a body of the vehicle, the guide comprises a first plate and a second plate which are spaced apart and parallel to each other when the seat member is lowered, the plates defining a space therebetween which receives the bearing mechanism;

the seat member is mounted on a third plate which is substantially parallel to the first and second plates, a portion of the third plate being above portions of the first and the second plate; and a bearing mechanism attached to a rear portion of the seat member, the bearing mechanism being slidable in the guide, the seat member being pivotal with respect to the guide about an axis of the bearing mechanism so that when the seat member is folded upwardly, the bearing mechanism slides downwardly along the guide and simultaneously rotates relative to the guide, and the sliding bearing mechanism engages an upper end of the third plate when the seat member is in its seated position.

23. A folding passenger seat for a work vehicle with a seat member which is pivotal from a lowered seated position to upper storage position, characterized by:

a guide mounted on a body of the vehicle;

a bearing mechanism attached to a rear portion of the seat member, the bearing mechanism being slidable in the guide, the seat member being pivotal with respect to the guide about an axis of the bearing mechanism so that when the seat member is folded upwardly, the bearing mechanism slides downwardly along the guide and simultaneously rotates relative to the guide;

an actuating lever which is pivotal about a pivot axis; and a spring biased to urge the actuating lever against an underside of the seat member.

24. A folding passenger seat for a work vehicle with a seat member which is pivotal from a lowered seated position to upper storage position, characterized by:

a guide mounted on a body of the vehicle;

a bearing mechanism attached to a rear portion of the seat member, the bearing mechanism being slidable in the guide, the seat member being pivotal with respect to the guide about an axis of the bearing mechanism so that when the seat member is folded upwardly, the bearing mechanism slides downwardly along the guide and simultaneously rotates relative to the guide, the bearing mechanism being positioned above a level of the seat member when the seat member is in its lowered position, and when the seat member is in its storage position the bearing mechanism having a vertical position which coincides with a vertical position of the bottom of the seat member when the seat member is in its lowered position.

* * * * *